US 11,378,001 B2

(12) United States Patent
Koyama et al.

(10) Patent No.: US 11,378,001 B2
(45) Date of Patent: Jul. 5, 2022

(54) ELECTRONIC FUEL INJECTION TYPE DIESEL ENGINE

(71) Applicant: KUBOTA Corporation, Osaka (JP)

(72) Inventors: Hideyuki Koyama, Sakai (JP); Mitsugu Okuda, Sakai (JP); Yuji Shinohara, Sakai (JP); Mitsuru Kamiyama, Sakai (JP); Hiroki Oso, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/282,904

(22) PCT Filed: Sep. 9, 2019

(86) PCT No.: PCT/JP2019/035303
§ 371 (c)(1),
(2) Date: Apr. 5, 2021

(87) PCT Pub. No.: WO2020/084933
PCT Pub. Date: Apr. 30, 2020

(65) Prior Publication Data
US 2021/0388754 A1    Dec. 16, 2021

(30) Foreign Application Priority Data
Oct. 26, 2018    (JP) .............................. JP2018-201842

(51) Int. Cl.
*F02B 19/08*    (2006.01)
*F02B 19/14*    (2006.01)
*F02M 61/18*    (2006.01)

(52) U.S. Cl.
CPC .............. *F02B 19/08* (2013.01); *F02B 19/14* (2013.01); *F02M 61/1813* (2013.01); *F02M 2200/40* (2013.01)

(58) Field of Classification Search
CPC ..... F02B 19/08; F02B 19/14; F02M 61/1833; F02M 2200/40
(Continued)

(56) References Cited

U.S. PATENT DOCUMENTS 4,193,379 A * 3/1980 Dietrich .................. F02B 19/14
                                                    123/262
4,294,208 A * 10/1981 Wagner .................. F02B 19/14
                                                    123/285
(Continued)

FOREIGN PATENT DOCUMENTS

CN    202954878 U  *  5/2013
JP    57183517 A   * 11/1982    .............. F02B 19/14
(Continued)

OTHER PUBLICATIONS

Int'l Search Report dated Nov. 19, 2019 in Int'l Application No. PCT/JP2019/035303.
(Continued)

*Primary Examiner* — Mahmoud Gimie
(74) *Attorney, Agent, or Firm* — Panitch Schwarze Belisario & Nadel LLP (57) ABSTRACT

An electronic fuel injection type diesel engine enables reduction in engine size. The electronic fuel injection type diesel engine is provided with: a combustion chamber inside a cylinder; a fuel injection chamber inside a cylinder head; a fuel injector that injects liquid fuel into the fuel injection chamber; a fuel accumulation unit that accumulates the liquid fuel injected from the fuel injector; and an electronic control unit that controls a timing and an amount of injection of the liquid fuel.

9 Claims, 4 Drawing Sheets

(58) Field of Classification Search
USPC .......................................... 123/263, 275, 267
See application file for complete search history.

(56) References Cited

U.S. PATENT DOCUMENTS

| | | | | |
|---|---|---|---|---|
| 5,307,772 | A | * | 5/1994 | Rao .................. F02B 51/02 |
| | | | | 123/272 |
| 5,410,993 | A | * | 5/1995 | Masuda .............. F02B 77/04 |
| | | | | 123/65 PE |
| 5,769,050 | A | * | 6/1998 | Ito ..................... F02B 19/08 |
| | | | | 123/257 |
| 2007/0023002 | A1 | * | 2/2007 | Alger, II ............. F02B 47/00 |
| | | | | 123/275 |
| 2015/0034043 | A1 | * | 2/2015 | Kuwayama ........ F02B 19/1009 |
| | | | | 123/275 |
| 2018/0328293 | A1 | * | 11/2018 | Hoshi ................ F02D 41/1475 |

FOREIGN PATENT DOCUMENTS

| | | | | |
|---|---|---|---|---|
| JP | S59120533 | A | | 7/1984 |
| JP | 59221419 | A | * 12/1984 | ............ F02B 19/08 |
| JP | S6136125 | U | | 3/1986 |
| JP | 1-104914 | A | | 4/1989 |
| JP | 6-33816 | A | | 2/1994 |
| JP | 14440/1994 | U | | 2/1994 |
| JP | 06221158 | A | * | 8/1994 |
| JP | H1104914 | A | | 1/1999 |
| JP | 11-173233 | A | | 6/1999 |
| JP | H11173233 | A | | 6/1999 |
| JP | 2014-020278 | A | | 2/2014 |
| JP | 6014440 | B2 | | 10/2016 |

OTHER PUBLICATIONS

Office Action dated Dec. 27, 2021 in Japanese Application No. 2018-201842.
Office Action dated Oct. 6, 2021 in Japanese Application No. 2018-201842.
Office Action dated Apr. 6, 2022 in Chinese Application No. 201980065174.7.

* cited by examiner

ELECTRONIC FUEL INJECTION TYPE DIESEL ENGINE

CROSS-REFERENCE TO RELATED APPLICATIONS

This application is a Section 371 of International Application No. PCT/JP2019/035303, filed Sep. 9, 2019, which was published in the Japanese language on Apr. 30, 2020 under International Publication No. WO 2020/084933 A1, and which claims priority under 35 U.S.C. § 119(b) to Japanese Patent Application No. 2018-201842, filed on Oct. 26, 2018; and the disclosures of each application cited in this paragraph are incorporated herein by reference.

TECHNICAL FIELD

The present invention relates to an electronic fuel injection type diesel engine, and more particularly to an electronic fuel injection type diesel engine capable of downsizing the engine.

BACKGROUND ART

Conventionally, as an electronic fuel injection type diesel engine, there is a direct injection type diesel engine equipped with a common rail system (see, for example, Patent Document 1).

PRIOR ART DOCUMENT

Patent Document

Patent Document 1: Japanese Patent Application Laid-open No. 2014-20278 (see FIG. 1)

SUMMARY OF THE INVENTION

Problems to be Solved by the Invention

In Patent Document 1, when a bore diameter of a cylinder is reduced, combustion deteriorates, and problems such as increases in high noise, fuel consumption, and smoke concentration occur, so that the engine cannot be miniaturized.

An object of the present invention is to provide an electronic fuel injection type diesel engine capable of downsizing the engine.

Solutions to the Problems

A main configuration of the present invention is as follows.

Figure 1:
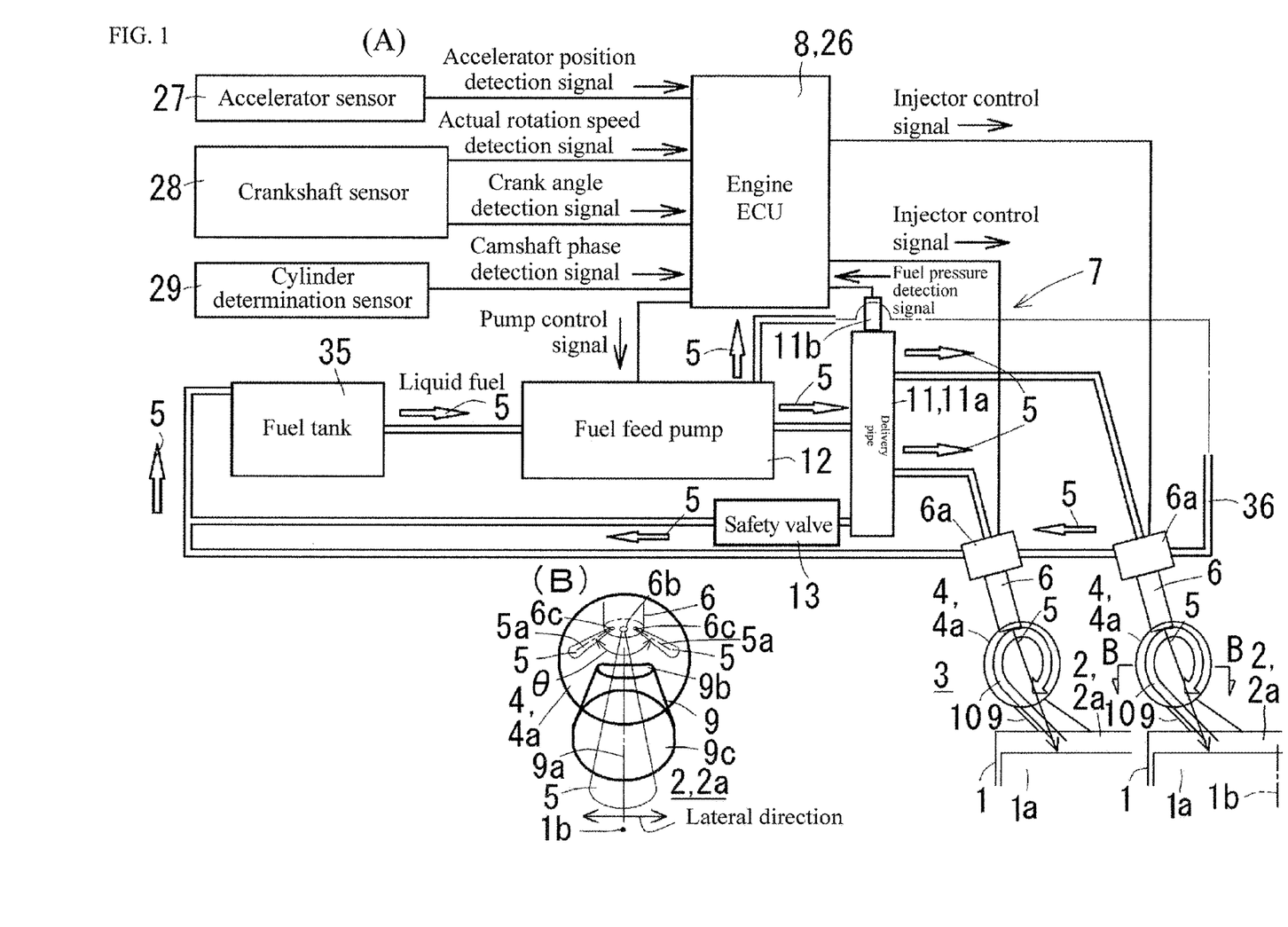
FIG. 1(A) is a block diagram illustrating signals of this engine and flows of liquid fuel.
FIG. 1(B) is an explanatory diagram of a sub-combustion chamber and injection patterns of the liquid fuel in a B-B line cross section of FIG. 1(A).

As illustrated in FIG. 1(A), an electronic fuel injection type diesel engine includes: a combustion chamber (2) inside a cylinder (1); a fuel injection chamber (4) inside a cylinder head (3); a fuel injector (6) that injects liquid fuel (5) into the fuel injection chamber (4); a fuel accumulation unit (7) that accumulates the liquid fuel (5) injected from the fuel injector (6); and an electronic control unit (8) that controls a timing and an amount of injection of the liquid fuel (5).

Effects of the Invention

In the present invention, injection of the liquid fuel (5) in the fuel injection chamber (4) is electronically controlled, and combustion in the combustion chamber (2) is controlled by adjusting premixing of the liquid fuel (5) and compressed air (10) in the fuel injection chamber (4). Thus, even if a bore diameter of the cylinder (1) is reduced, noise, fuel consumption, and smoke concentration can be kept low, and the engine can be miniaturized.

BRIEF DESCRIPTION OF THE DRAWINGS

FIGS. 1(A) and 1(B) are diagrams illustrating an electronic fuel injection type diesel engine according to an embodiment of the present invention.

EMBODIMENTS OF THE INVENTION

FIGS. 1(A) to 4 are diagrams for explaining an electronic fuel injection type diesel engine according to an embodiment of the present invention, and in this embodiment, a water-cooled in-line two-cylinder electronic fuel injection type diesel engine will be described.

This engine will be described with the installation direction of a crankshaft (15) shown in FIG. 3 taken as a front-rear direction and a horizontal direction orthogonal to the front-rear direction taken as a left-right direction.

Figure 2:
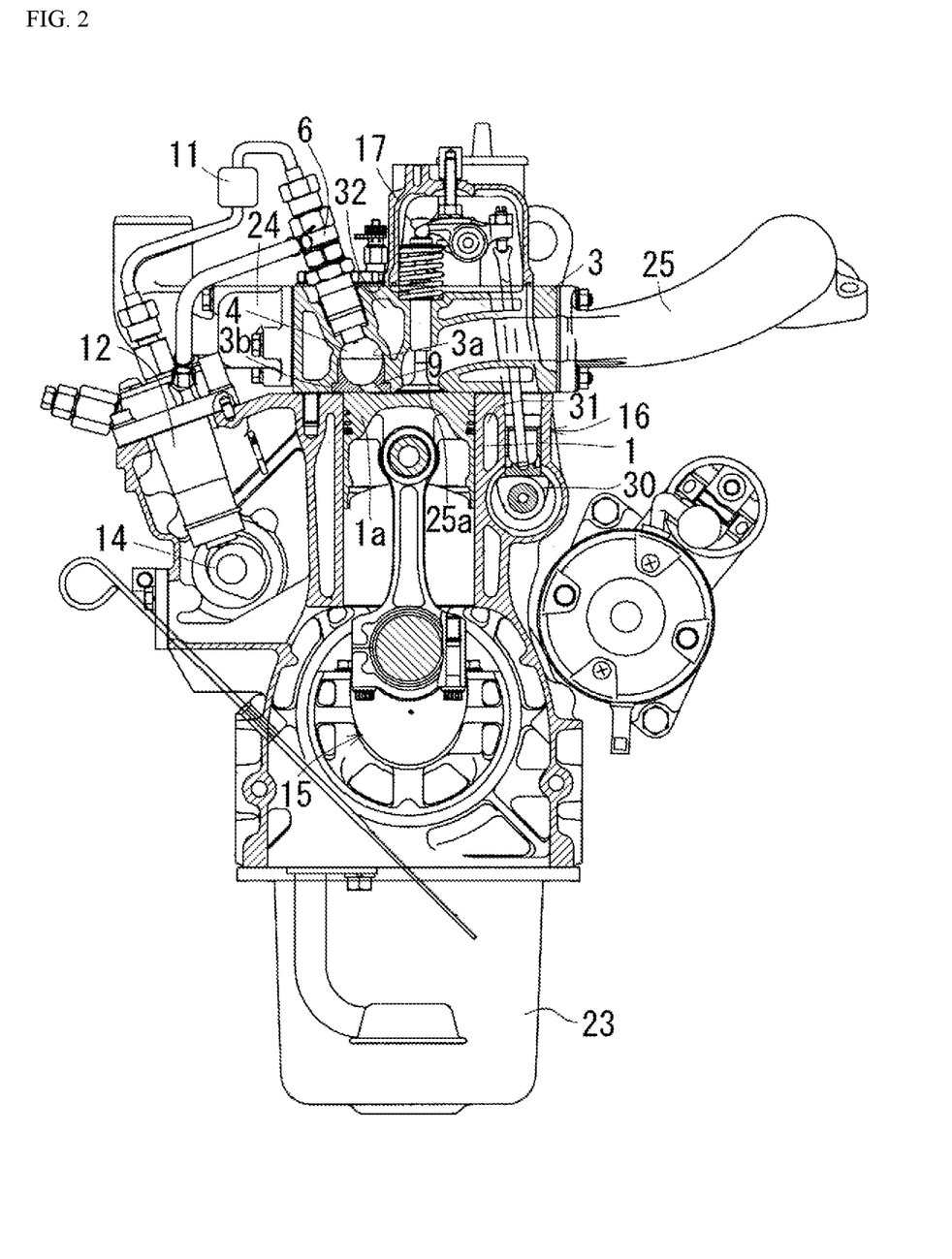
FIG. 2 is a vertical sectional front view of the electronic fuel injection type diesel engine according to the embodiment of the present invention.
Figure 3:
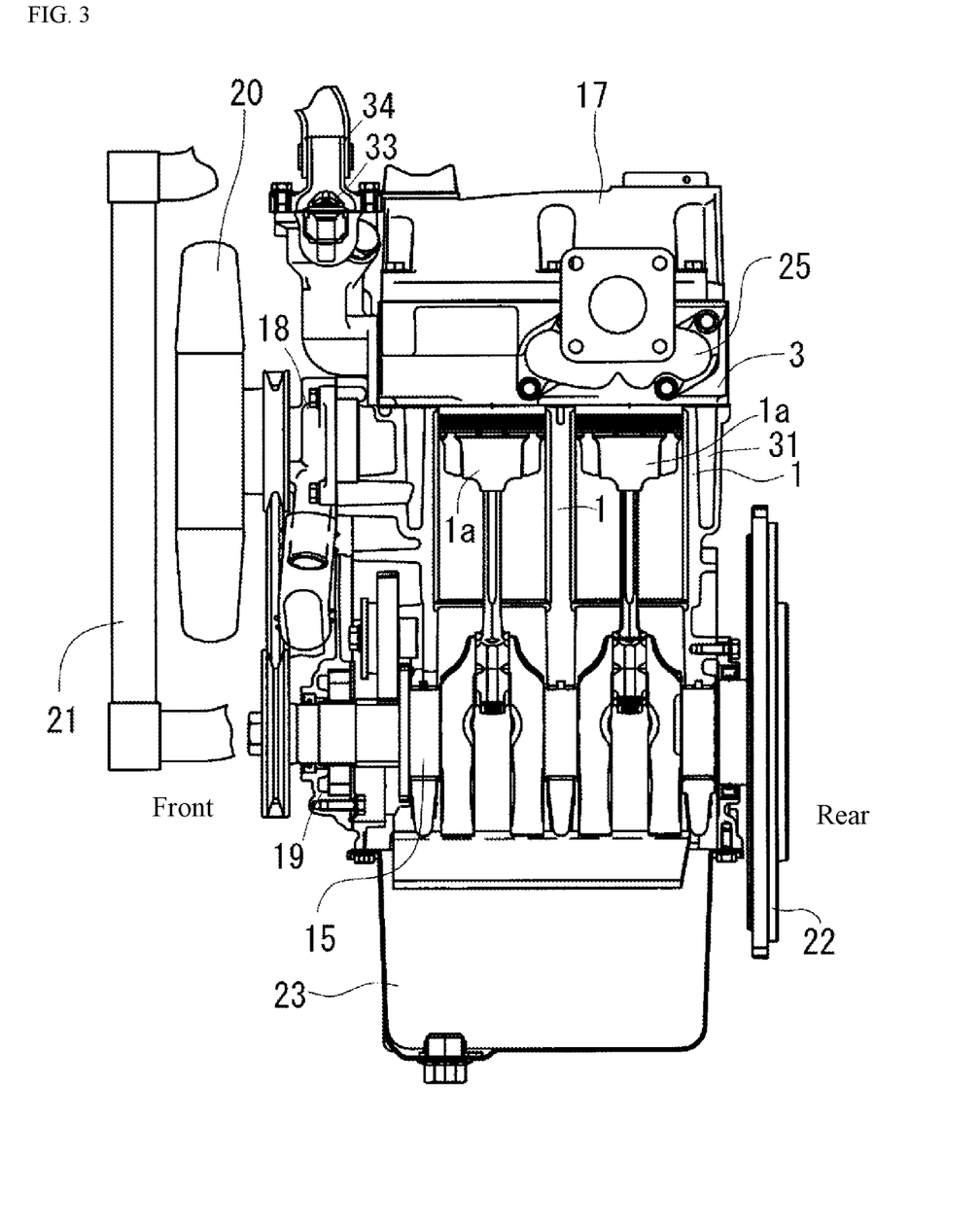
FIG. 3 is a vertical sectional side view of the engine of FIG. 2.
Figure 4:
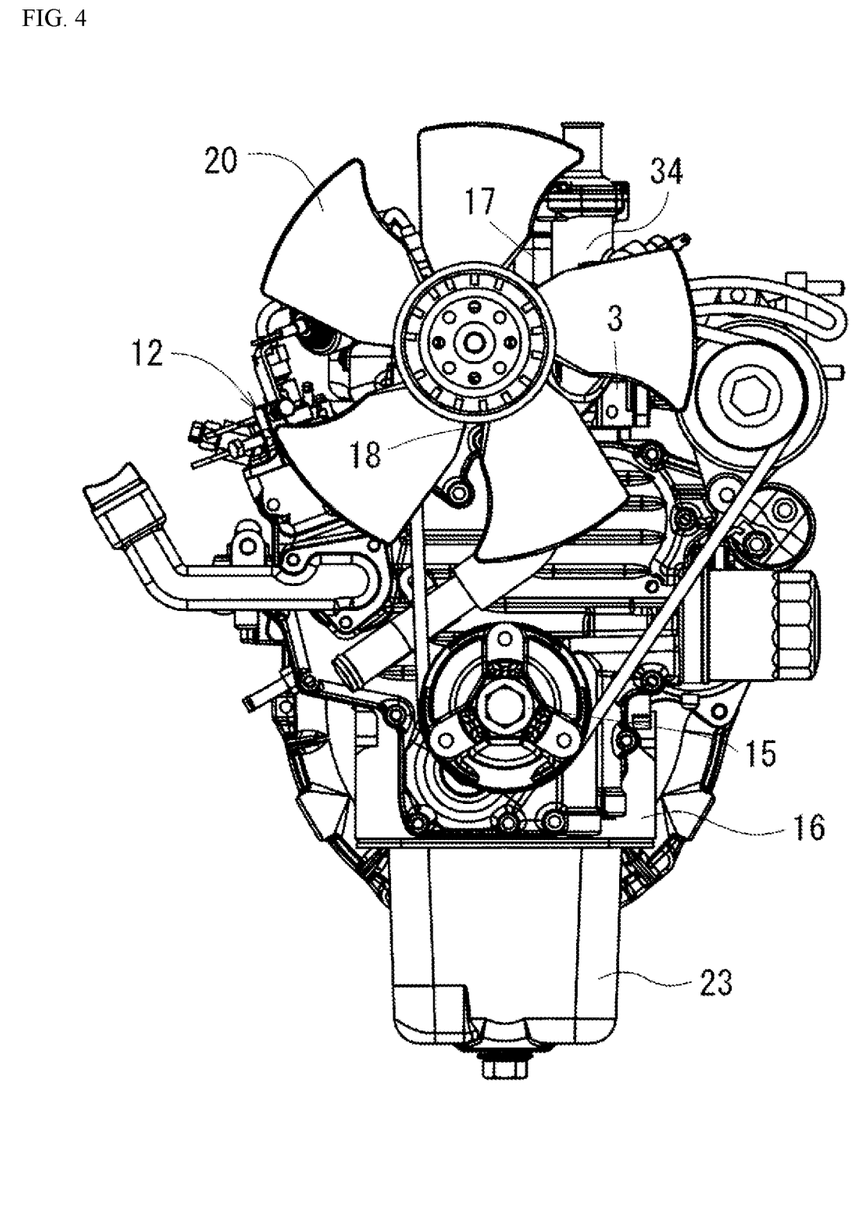
FIG. 4 is a front view of the engine of FIG. 2.

As shown in FIGS. 2 to 4, this engine includes a cylinder block (16), a cylinder head (3) mounted on the top of the cylinder block (16), a cylinder head cover (17) mounted on the top of the cylinder head (3), a water pump (18) and an oil pump (19) shown in FIG. 3 mounted on the front of the cylinder block (16), an engine cooling fan (20) mounted on the front of the water pump (18), a radiator (21) located in front of the engine cooling fan (20), a flywheel (22) located at the rear of the cylinder block (16), and an oil pan (23) mounted on the bottom of the cylinder block (16).

This engine includes an intake device, an exhaust device, a combustion device, an electronic control unit, and an engine water cooling device.

The intake device includes an intake manifold (24) shown in FIG. 2 and an air cleaner (not shown) connected to an intake upstream side of the intake manifold (24).

The exhaust device includes an exhaust manifold (25) shown in FIG. 2 and an exhaust treatment unit (not shown) connected to an exhaust downstream side of the exhaust manifold (25).

The intake manifold (24) is located on one side of left and right sides of the cylinder head (3), and the exhaust manifold (25) is located on another side of the left and right sides of the cylinder head (3).

As shown in FIG. 1(A), the combustion device includes a combustion chamber (2) inside a cylinder (1), a fuel injection chamber (4) inside the cylinder head (3), a fuel injector (6) that injects liquid fuel (5) into the fuel injection chamber (4), a fuel accumulation unit (7) that accumulates the liquid fuel (5) injected from the fuel injector (6), and an electronic control unit (8) that controls a timing and an amount of injection of the liquid fuel (5).

Therefore, injection of the liquid fuel (5) is electronically controlled, and combustion in the combustion chamber (2)

is optimized by adjusting premixing of the liquid fuel (5) and compressed air (10) in the fuel injection chamber (4). Even if a bore diameter of the cylinder (1) is reduced, noise, fuel consumption, and smoke concentration can be kept low, and the engine can be miniaturized.

An engine ECU (26) is used for the electronic control unit (8). ECU is an abbreviation for an electronic control unit and is a microcomputer. As shown in FIG. 1(A), an accelerator sensor (27), a crankshaft sensor (28), and a cylinder determination sensor (29) are electrically connected to the engine ECU (26). The accelerator sensor (27) transmits an accelerator position detection signal to the engine ECU (26) based on detection of an operation position of an accelerator lever (not shown). The crankshaft sensor (28) detects actual rotation speed and a crank angle of the crankshaft (15), and transmits an actual rotation speed detection signal and a crank angle detection signal to the engine ECU (26). The cylinder determination sensor (29) detects a phase of a valve drive camshaft (30) shown in FIG. 2 and transmits a camshaft phase detection signal to the engine ECU (26). This engine is a four-cycle engine, and the valve drive camshaft (30) is a camshaft that opens and closes an intake valve (not shown) and an exhaust valve (25a).

The engine ECU (26) has an electronic governor function. A deviation between target rotation speed and actual rotation speed of the engine is calculated based on the accelerator position detection signal and the actual rotation speed detection signal, and an engine load is calculated based on the calculation. Based on the target rotation speed of the engine and the engine load, a timing and an amount of injection of the liquid fuel (5) of the fuel injector (6) are set by a fuel control map stored in a memory. An injector control signal is transmitted to a solenoid valve (6a) of the fuel injector (6). By this injector control signal, the solenoid valve (6a) of the fuel injector (6) is opened for a predetermined time at a predetermined timing, and a predetermined amount of liquid fuel (5) is injected from the fuel injector (6) at a predetermined timing. The liquid fuel (5) is light oil.

A potentiometer is used for the accelerator sensor (27) shown in FIG. 1(A).

A pickup coil is used for the crankshaft sensor (28). This crankshaft sensor (28) is a proximity sensor that detects that a protrusion of a crankshaft detection disc (not shown) attached to the flywheel (22) passes in front of the sensor. The crankshaft detection disc includes one starting point protrusion on the periphery and a large number of phase protrusions provided at equal pitches.

A pickup coil is also used for the cylinder determination sensor (29). This cylinder determination sensor (29) is a proximity sensor that detects that a protrusion of a camshaft phase detection disc (not shown) attached to the valve drive camshaft (30) shown in FIG. 2 passes in front of the sensor. The camshaft phase detection disc includes one protrusion on the periphery.

The crankshaft sensor (28) and the cylinder determination sensor (29) transmit, to the engine ECU (26), an actual rotation speed detection signal, a crank angle detection signal, and a camshaft phase detection signal by pickup signals of the protrusions. In the engine ECU (26), actual rotation speed and a crank angle of the engine are calculated from the actual rotation speed detection signal and the crank angle detection signal, and a stroke of each cylinder in a combustion cycle is determined from the camshaft phase detection signal.

As shown in FIG. 1(B), a plurality of fuel injection holes (6b) (6c) of the fuel injector (6) is provided.

Therefore, the liquid fuel (5) injected from the plurality of fuel injection holes (6b) (6c) of the fuel injector (6) is widely diffused in the fuel injection chamber (4), and premixing of the liquid fuel (5) and the compressed air (10) in the fuel injection chamber (4) is promoted.

As shown in FIG. 1(B), an injection direction of the liquid fuel (5) injected from the fuel injection hole (6c) of the fuel injector (6) is toward an inner surface of the fuel injection chamber (4).

Therefore, the liquid fuel (5) is injected from the fuel injection hole (6c) shown in FIG. 1(B) to the compressed air (10) that is pushed into the fuel injection chamber (4) from the combustion chamber (2) inside the cylinder (1) shown in FIG. 1(A) and flows along the inner surface thereof. The liquid fuel (5) is widely diffused into the compressed air (10), and premixing of the liquid fuel (5) and the compressed air (10) in the fuel injection chamber (4) is promoted.

As shown in FIG. 1(A), the combustion chamber (2) inside the cylinder (1) serves as a main combustion chamber (2a), and the fuel injection chamber (4) serves as a sub-combustion chamber (4a) communicated with the main combustion chamber (2a) via an injection port (9).

Therefore, a part of the liquid fuel (5) injected from the fuel injector (6) is premixed and burned with the compressed air (10) in the sub-combustion chamber (4a), and the rest is combustion gas in the premixed combustion and injected into the main combustion chamber (2a) from the injection port (9). The liquid fuel (5) is widely diffused in the main combustion chamber (2a), and combustion in the main combustion chamber (2a) is promoted.

As shown in FIG. 1(A), the main combustion chamber (2a) is formed between a piston (la) and the cylinder head (3) in the cylinder (1). As shown in FIG. 2, the sub-combustion chamber (4a) is formed between a recess (3a) on a bottom surface of the cylinder head (3) and a base (3b) fitted in the recess (3a), and the injection port (9) is formed on the base (3b).

As shown in FIG. 1(A), the sub-combustion chamber (4a) serves as a vortex chamber.

Therefore, the liquid fuel (5) injected from the fuel injector (6) is caught in a vortex flow of the compressed air (10) pushed into the vortex chamber from the main combustion chamber (2a), and premixing of the liquid fuel (5) and the compressed air (10) in the sub-combustion chamber (4a) is promoted.

As shown in FIG. 1(B), when viewed in a direction parallel to a cylinder central axis (1c), a direction orthogonal to an injection port central axis (9a) is taken as a lateral direction, and an opening end (9b) on the sub-combustion chamber (4a) side of the injection port (9) is formed by a laterally long hole.

As a result, the compressed air (10) flowing into the sub-combustion chamber (4a) from the injection port (9) easily flows into a lateral space of the sub-combustion chamber (4a) through the laterally long opening end (9b), a flow of air in the lateral space is promoted, and an air utilization rate in the sub-combustion chamber (4a) increases.

As shown in FIG. 1(B), width of an opening end (9c) on the main combustion chamber (2a) side of the injection port (9) is formed longer than width of the opening end (9b) on the sub-combustion chamber (4a) side.

As a result, combustion gas containing unburned fuel ejected from the injection port (9) into the main combustion chamber (2a) is widely ejected into the main combustion chamber (2a) through the wide opening end (9c), and an air utilization rate in the main combustion chamber (2a) increases.

As shown in FIGS. 1(A) and 1(B), the injection port (9) has an expanded shape with a cross-sectional area expanding toward the main combustion chamber (2a).

As a result, the combustion gas containing unburned fuel ejected from the injection port (9) into the main combustion chamber (2a) is widely diffused into the main combustion chamber (2a) through the injection port (9) having the expanded shape, and the air utilization rate in the main combustion chamber (2a) increases.

As shown in FIG. 1(B), the plurality of fuel injection holes (6b) (6c) includes the single fuel injection hole (6b) in the center in the left-right direction and the pair of fuel injection holes (6c) (6c) disposed on the left and right sides thereof.

The left and right fuel injection holes (6c) (6c) have smaller hole diameters than the central fuel injection hole (6b), and an injection pattern of the liquid fuel (5) injected from the left and right fuel injection holes (6c) (6c) is a finer spray with smaller oil droplets than that from the central fuel injection hole (6b). Injection directions of the liquid fuel (5) from the left and right fuel injection holes (6c) (6c) are toward an inner surface of the sub-combustion chamber (4a) located on the left and right of the injection port (9). An injection direction of the liquid fuel (5) from the fuel injection hole (6b) is toward the main combustion chamber (2a) via the injection port (9).

Injection directions of the liquid fuel (5) from the plurality of fuel injection holes (6b) (6c) may all be toward the main combustion chamber (2a) via the injection port (9).

Further, the injection port (9) may be composed of a central injection port (not shown) in the left-right direction and a pair of injection ports disposed on the left and right thereof.

In this case, injection directions of the liquid fuel (5) from the plurality of fuel injection holes (6b) (6c) may all be toward the main combustion chamber (2a) through different injection ports. Alternatively, only an injection direction of the liquid fuel (5) from the central fuel injection hole (6b) may be toward the main combustion chamber (2a) through the central injection port, and injection directions of the liquid fuel (5) from the left and right fuel injection holes (6c) (6c) may be toward the inner surface of the sub-combustion chamber (4a) located on the left and right of the central injection port.

Injection pressure of the liquid fuel (5) from the fuel injector (6) is set to 5 to 50 MPa (megapascal).

The injection pressure of the liquid fuel (5) from this fuel injector (6) is set quite low, while it generally sets to 120 to 160 MPa for an existing common rail type diesel engine that injects fuel directly into a combustion chamber inside a cylinder.

If the injection pressure of the liquid fuel (5) from the fuel injector (6) is less than 5 MPa, penetration force of the liquid fuel (5) in the fuel injection chamber (4) is insufficient, and if it exceeds 50 MPa, flight time of the liquid fuel (5) in the fuel injection chamber (4) is insufficient. In either case, there is a possibility that premixing of the liquid fuel (5) and the compressed air (10) in the fuel injection chamber (4) is stagnant. On the other hand, the above problems are unlikely to occur at 5 to 50 MPa, and premixing of the liquid fuel (5) and the compressed air (10) in the fuel injection chamber (4) is promoted.

Furthermore, the injection pressure of the liquid fuel (5) from the fuel injector (6) is only 5 to 50 MPa, and despite being the diesel engine, parts of the fuel injector (6) and fuel accumulation unit (7) of a low-pressure fuel injection gasoline injection system or the like can be diverted, and the parts can be shared with other low-pressure fuel injection systems.

As shown in FIG. 1(A), the fuel accumulation unit (7) includes an accumulator (11) and a fuel feed pump (12) that supplies the accumulator (11) with the liquid fuel (5).

In this case, the injection pressure of the liquid fuel (5) from the fuel injector (6) is only 5 to 50 MPa, and despite being the diesel engine, the accumulator (11) and the fuel feed pump (12) of the low-pressure fuel injection gasoline injection system or the like can be diverted as they are, and the parts of the fuel accumulation unit (7) can be shared with the other low-pressure fuel injection systems.

As shown in FIG. 1(A), the accumulator (11) is a delivery pipe (11a) that distributes the liquid fuel (5) to the plurality of fuel injectors (6).

In this case, fuel pressure in the delivery pipe (11a) is about 5 to 50 MPa, and despite being the diesel engine, the delivery pipe (11a) of the low-pressure fuel injection gasoline injection system or the like can be diverted as it is, and the part of the fuel accumulation unit (7) can be shared with other multi-cylinder low-pressure fuel injection systems.

As shown in FIG. 1(A), the delivery pipe (11a) includes a fuel pressure sensor (11b), and the fuel pressure in the delivery pipe (11a) detected by the fuel pressure sensor (11b) is sent to the engine ECU (26) as a fuel pressure detection signal. A pump control signal is sent from the engine ECU (26) to an electric actuator (not shown) of the fuel feed pump (12), an amount of liquid fuel (5) supplied to the delivery pipe (11a) is controlled by controlling rotation speed of the fuel feed pump (12), and the fuel pressure in the delivery pipe (11a) is adjusted. As shown in FIG. 2, the fuel feed pump (12) is pumped by a pump drive cam driven by the electric actuator.

Note that a reference numeral (13) in FIG. 1(A) indicates a safety valve, and when the fuel pressure in the delivery pipe (11a) exceeds a predetermined upper limit, the valve is opened to decrease the fuel pressure in the delivery pipe (11a).

As a system for adjusting the fuel pressure in the delivery pipe (11a), there may be a system in which an electric spill valve (not shown) for leaking the liquid fuel in the delivery pipe (11a) to a fuel tank (35) side is provided, the fuel pressure in the delivery pipe (11a) detected by the fuel pressure sensor (11b) is sent to the engine ECU (26) as a fuel pressure detection signal, a valve control signal is sent from the engine ECU (26) to an actuator of the electric spill valve, and an amount of leakage of the liquid fuel (5) from the delivery pipe (11a) is controlled by controlling an opening degree of the electric spill valve.

As shown in FIG. 2, in this embodiment, despite being the diesel engine, the fuel feed pump (12), the delivery pipe (11a), and the fuel injector (6) of the existing gasoline injection system are diverted as they are.

As shown in FIG. 1(A), the fuel is supplied to the fuel feed pump (12) from the fuel tank (35), and a part of the liquid fuel (5) of the fuel feed pump (12) or the fuel injector (6) overflows and returns to the fuel tank (35) via a fuel return passage (36), thereby eliminating air pools in the fuel feed pump (12) and the fuel injector (6).

In the above embodiment, the injection pressure of the liquid fuel (5) from the fuel injector (6) is set to 5 to 50 MPa from the viewpoint of promoting premixing of the liquid fuel (5) and the compressed air (10) in the fuel injection chamber (4), but it is more desirable to set this injection pressure to 10 to 40 MPa. This is because a function of promoting premixing can be obtained more reliably.

Injection of the liquid fuel (5) from the fuel injector (6) includes main injection and pre-injection prior to the main injection.

Therefore, the liquid fuel (5) in the pre-injection is mixed and burned with the compressed air (10) in the fuel injection chamber (4), and the liquid fuel (5) in the main injection is ignited by combustion gas in the pre-injection, so that combustion of the liquid fuel (5) and the compressed air (10) in the fuel injection chamber (4) is promoted.

As shown in FIG. 3, the engine water cooling device includes the radiator (21) that radiates heat from engine cooling water, the water pump (18) that sucks the engine cooling water with the heat radiated by the radiator (21) and pumps it to a cylinder jacket, the cylinder jacket (31), a cylinder head jacket (32) in FIG. 2 that communicates with the cylinder jacket (31), a water flange (34) with a built-in thermostat valve (33) that controls return of the engine cooling water from the cylinder head jacket (32) to the radiator (21) and its stop, and a return pipe (not shown) that returns the engine cooling water in the cylinder head jacket (32) to the water pump (18) from the water flange (34).

In the engine water cooling device, while temperature of the engine cooling water is relatively low, the thermostat valve (33) is closed so that an entire amount of the engine cooling water is sucked from the return pipe into the water pump (18), and is circulated between the cylinder jacket (31) and the cylinder head jacket (32) while bypassing the radiator (21) to warm up the engine.

When the temperature of the engine cooling water rises, the thermostat valve (33) is opened, the engine cooling water is circulated between the radiator (21), the water pump (18), the cylinder jacket (31), and the cylinder head jacket (32) in that order to cool the engine. A part of the engine cooling water is sucked into the water pump (18) from the return pipe and bypasses the radiator (21).

The embodiment of the present invention is as described above, but the present invention is not limited to the above embodiment.

Although the two-cylinder engine has been described in the above embodiment, the present invention can also be applied to a single-cylinder engine or a multi-cylinder engine having three or more cylinders.

Further, the fuel injection chamber (4) does not necessarily have to be a sub-chamber type, and may be a chamber having no injection port (9), that is, a chamber in which the bottom surface of the cylinder head (3) is simply recessed.

Further, the fuel injection holes of the fuel injector (6) do not necessarily have to be plural, and may be single. In this case, injection of the liquid fuel (5) injected from the fuel injection hole does not necessarily have to be directed to the inner surface of the fuel injection chamber (4), and may be directed to the main combustion chamber (2a) via the injection port (9). Further, when there is no injection port (9), it may be directed to the main combustion chamber (2a) through an opening of the fuel injection chamber (4).

In the above embodiment, calculation of the actual rotation speed and the crank angle of the engine and determination of the stroke of each cylinder in the combustion cycle are based on detection by two sensors including the crankshaft sensor (28) and the cylinder determination sensor (29). However, instead of these two sensors, the calculation of the actual rotation speed and the crank angle of the engine and the determination of the stroke of each cylinder in the combustion cycle can also be performed based on detection by one phase sensor (not shown). A pickup coil is used for this phase sensor. This phase sensor is a proximity sensor that detects that a protrusion of a phase detection disc (not shown) attached to the valve drive camshaft (30) passes in front of the sensor. The phase detection sensor includes one starting point protrusion on the periphery and a large number of phase protrusions provided at equal pitches. This phase sensor transmits a pickup signal of the protrusion to the engine ECU (26). In the engine ECU (26), the actual rotation speed and the crank angle of the engine are calculated based on a period of a pulse wave of the pickup signal and an ordinal number of the pulse wave of the protrusion passing in front of the sensor, and the stroke of each cylinder in the combustion cycle is determined by a phase of the pulse wave of the protrusion passing in front of the sensor.

In this embodiment, since the injection pressure of the liquid fuel (5) from the fuel injector (6) is only 5 to 50 MPa, despite being the electronic fuel injection type diesel engine, a low-pressure fuel injection pump for a sub-chamber type combustion chamber of a mechanical cam fuel injection type diesel engine can be diverted as the fuel feed pump (12). In this case, the part can be shared with the mechanical cam fuel injection type diesel engine. This fuel feed pump (12) is driven by the existing fuel injection camshaft (14).

DESCRIPTION OF REFERENCE SIGNS (1): Cylinder
(1b): Cylinder central axis
(2): Combustion chamber
(2a): Main combustion chamber
(3): Cylinder head
(4): Fuel injection chamber
(4a): Sub-combustion chamber
(5): Liquid fuel
(6): Fuel injector
(6b) (6c): Fuel injection hole
(7): Fuel accumulation unit
(8): Electronic control unit
(9): Injection port
(9a): Injection port central axis
(9b) (9c): Opening end
(10): Compressed air
(11): Accumulator
(11a): Delivery pipe
(12): Fuel feed pump

We claim:
1. An electronic fuel injection type diesel engine comprising:
a combustion chamber (2) inside a cylinder (1);
a fuel injection chamber (4) inside a cylinder head (3);
a fuel injector (6) that injects liquid fuel (5) into the fuel injection chamber (4);
a fuel accumulation unit (7) that accumulates the liquid fuel (5) injected from the fuel injector (6); and
an electronic control unit (8) that controls a timing and an amount of injection of the liquid fuel (5),
wherein the combustion chamber (2) inside the cylinder (1) serves as a main combustion chamber (2a), and the fuel injection chamber (4) serves as a vortex chamber communicated with the main combustion chamber (2a) via an injection port (9), and compressed air (10) that becomes a swirl flow swirling in the vortex chamber is introduced from the main combustion chamber (2a) to the vortex chamber via an injection port (9),
wherein the fuel injector (6) includes a plurality of fuel injection holes (6b) (6c), when viewed in a direction parallel to a cylinder central axis (1b), a direction orthogonal to an injection port central axis (9a) is taken as a lateral direction, the plurality of fuel injection holes (6b) (6c) includes a single fuel injection hole (6b) in a center and a pair of fuel injection holes (6c) (6c) disposed on both sides thereof in the lateral direction, an injection of the liquid fuel (5) from the single fuel injection hole (6b) is directed toward the main combustion chamber (2a) via an inside of a center in a left-right direction of the vortex chamber and an inside of the injection port (9) in this order, injection directions of the liquid fuel (5) from the pair of fuel injection holes (6c) (6c) are toward an inner surface of both sides in the lateral direction of the vortex chamber located on both sides in the lateral direction of the injection port (9), and the pair of fuel injection holes (6c) (6c) have smaller hole diameters than the single fuel injection hole (6b).

2. The electronic fuel injection type diesel engine according to claim 1, wherein when viewed in a direction parallel to a cylinder central axis (1c), a direction orthogonal to an injection port central axis (9a) is a lateral direction, and an opening end (9b) on a vortex chamber side of the injection port (9) is formed by a laterally long hole.

3. The electronic fuel injection type diesel engine according to claim 2, wherein lateral width of an opening end (9c) on a main combustion chamber (2a) side of the injection port (9) is formed longer than lateral width of the opening end (9b) on the vortex chamber side.

4. The electronic fuel injection type diesel engine according to claim 1, wherein the injection port (9) has an expanded shape with a cross-sectional area expanding toward the main combustion chamber (2a).

5. The electronic fuel injection type diesel engine according to claim 1, wherein injection pressure of the liquid fuel (5) from the fuel injector (6) is set to 5 to 50 MPa.

6. The electronic fuel injection type diesel engine according to claim 5, wherein the fuel accumulation unit (7) includes an accumulator (11) and a fuel feed pump (12) that supplies the liquid fuel (5) to the accumulator (11).

7. The electronic fuel injection type diesel engine according to claim 6, wherein the accumulator (11) is a delivery pipe (11a) that distributes the liquid fuel (5) to a plurality of the fuel injectors (6).

8. The electronic fuel injection type diesel engine according to claim 1, wherein injection of the liquid fuel (5) from the fuel injector (6) includes main injection and pre-injection prior to the main injection.

9. The electronic fuel injection type diesel engine according to claim 1, wherein injections of the liquid fuel (5) (5) from the pair of fuel injection holes (6c) (6c) are directed such that an angle ($\theta$) between both central axes (5a) (5a) of the injections of the liquid fuel (5) (5) from the pair of fuel injection holes (6c) (6c) is an obtuse angle, when viewed in the direction parallel to a cylinder central axis (1b).

* * * * *